United States Patent
Beck et al.

(10) Patent No.: US 9,803,722 B2
(45) Date of Patent: Oct. 31, 2017

(54) MULTI-STAGE AUTOMATIC TRANSMISSION

(71) Applicant: ZF Friedrichshafen AG, Friedrichshafen (DE)

(72) Inventors: Stefan Beck, Eriskirch (DE); Christian Sibla, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 36 days.

(21) Appl. No.: 15/010,621

(22) Filed: Jan. 29, 2016

(65) Prior Publication Data

US 2016/0223055 A1  Aug. 4, 2016

(30) Foreign Application Priority Data

Jan. 30, 2015 (DE) .................. 10 2015 201 654

(51) Int. Cl.
*F16H 3/62* (2006.01)
*F16H 3/44* (2006.01)
(Continued)

(52) U.S. Cl.
CPC ....... *F16H 3/66* (2013.01); *F16H 2200/0073* (2013.01); *F16H 2200/2012* (2013.01); *F16H 2200/2048* (2013.01)

(58) Field of Classification Search
CPC .................. F16H 2200/2012; F16H 2200/2048
See application file for complete search history.

(56) References Cited

U.S. PATENT DOCUMENTS 8,425,370 B2  4/2013 Leesch et al.
8,591,376 B1  11/2013 Shim et al.
(Continued)

FOREIGN PATENT DOCUMENTS

DE  102008055626 A1  5/2010

OTHER PUBLICATIONS

German Patent Office Search Report, dated Aug. 14, 2015.

*Primary Examiner* — Tisha Lewis
(74) *Attorney, Agent, or Firm* — Dority & Manning, P.A.

(57) ABSTRACT

An automatic transmission has eight rotatable shafts, four planetary gear sets and seven shift elements for shifting several forward gears and one reverse gear. A first element of the second planetary gear set forms the first shaft designed as the drive shaft of the transmission. A second element of the third planetary gear set forms the second shaft designed as the output shaft of the transmission. A second element of the first planetary gear set forms the third shaft. A first element of the first planetary gear set forms the fourth shaft. A third element of third planetary gear set forms the fifth shaft. As the sixth shaft, a third element of the first planetary gear set, a second element of the second planetary gear set and a first element of the third planetary gear set are constantly connected. A third element of the second planetary gear set forms the seventh shaft. A first brake is arranged in the power flow between the third shaft and the housing. A second brake is arranged in the power flow between the fourth shaft and the housing, a third brake is arranged in the power flow between the fifth shaft) and the housing. A first clutch (C1) is arranged in the power flow between the first and the seventh shafts. A second clutch is arranged in the power flow between the first and third shafts. A third clutch is constantly connected to the eighth shaft. A fourth clutch is in the power flow between the first and fourth shafts.

14 Claims, 5 Drawing Sheets

(51) Int. Cl.
*F16H 37/06* (2006.01)
*F16H 3/66* (2006.01)

(56) References Cited

U.S. PATENT DOCUMENTS

| | | | |
|---|---|---|---|
| 2008/0293537 A1* | 11/2008 | Phillips | F16H 3/663 475/283 |
| 2012/0172173 A1 | 7/2012 | Wittkopp et al. | |
| 2015/0099603 A1* | 4/2015 | Goleski | F16H 3/62 475/275 |

* cited by examiner

Fig. 2

| Gear | Engaged Shifting Elements ||||||||
| | Brake ||| Clutch ||||
| | B1 | B2 | B3 | C1 | C2 | C3 | C4 |
|---|---|---|---|---|---|---|---|
| 1 | X | | X | X | | | |
| 2 | | X | X | X | | | |
| 3 | | | X | X | X | | |
| 4 | | X | X | | X | | |
| 5 | | | X | | | X | |
| 6 | | X | | | X | X | |
| 7 | | | | X | X | X | |
| 8 | | X | | X | X | X | |
| 9 | X | | | X | | X | |
| 10 | X | | | | | X | X |
| 11 | X | | | | | X | X |
| R1 | X | | X | | | | |

Fig. 4

MULTI-STAGE AUTOMATIC TRANSMISSION

FIELD OF THE INVENTION

This invention relates to a multi-speed automatic transmission in planetary design.

BACKGROUND OF THE INVENTION

Generally, automatically shiftable vehicle transmissions in planetary design are already described in the state of the art many times over, and are subject to continuous development and improvement. Such transmissions should feature a sufficient number of forward gears and one reverse gear, and a transmission ratio that is very well-suited for motor vehicles with a high overall spread, favorable progressive steps, and a sufficiently large start-up transmission ratio for the specific application. In addition, this transmission should require low construction costs, in particular a low number of shift elements and, upon a sequential shifting operation, should avoid so-called "group gearshifts," such that, when there are gearshifts to the next higher or next lower gear, only one previously engaged shift element is open, and one previously open shift element is engaged.

Such a multi-speed automatic transmission is shown, for example, in U.S. Pat. No. 8,591,376 B1, which conforms to this type. It essentially comprises, including a drive shaft and an output shaft, eight rotatable shafts, a total of four individual planetary gear sets and seven shift elements. Through the selective blocking or engaging of three of the seven shift elements, a total of eleven forward gears can be shifted without any group gearshifts. Through the blocking or engaging of three of the seven shift elements, one reverse gear can also be engaged. Three of the shift elements are designed as brakes, and four of the shift elements as are designed as clutches. Each of the four planetary gear sets is designed as a so-called "negative planetary gear," comprising one sun gear, one ring gear and one planetary gear carrier with planetary gears rotatably mounted thereon, whereas each of the planetary gears are in mesh with both the sun gear and the ring gear of such planetary gear set.

With respect to kinematics, with the multi-speed automatic transmission, U.S. Pat. No. 8,591,376 B1 provides the following:

The drive shaft forms the first shaft of the transmission and is constantly connected to the planetary gear carrier of the second planetary gear set.

As the second shaft of the transmission, the planetary gear carrier of the third planetary gear set and the ring gear of the fourth planetary gear set and the output shaft are constantly connected to each other.

As the third shaft of the transmission, the planetary gear carrier of the first planetary gear set and the ring gear of the second planetary gear set are constantly connected to each other.

The sun gear of the first planetary gear set forms the fourth shaft of the transmission.

The ring gear of the third planetary gear set forms the fifth shaft of the transmission.

As the sixth shaft of the transmission, the ring gear of the first planetary gear set and the sun gear of the third planetary gear set and the sun gear of the fourth planetary gear set are constantly connected to each other.

The planetary gear carrier of the second planetary gear set forms the seventh shaft of the transmission.

The planetary gear carrier of the fourth planetary gear set forms the eighth shaft of the transmission.

In an engaged state, the first brake connects the third shaft to the transmission housing.

In an engaged state, the second brake connects the fourth shaft to the transmission housing.

In an engaged state, the third brake connects the fifth shaft to the transmission housing.

In an engaged state, the first clutch connects the sixth shaft to the seventh shaft.

In an engaged state, the second clutch connects the first shaft to the third shaft.

In an engaged state, the third clutch connects the first shaft to the eighth shaft.

In an engaged state, the fourth clutch connects the first shaft to the fourth shaft.

SUMMARY OF THE INVENTION

The present invention is based on a task of specifying an alternative multi-speed transmission of the aforementioned type with a total of four planetary gear sets, which, by means of a relatively low modified transmission diagram, features eleven forward gears that can be shifted without any group gearshifts. Moreover, one reverse gear can be shifted. Additional objects and advantages of the invention will be set forth in part in the following description, or may be obvious from the description, or may be learned through practice of the invention.

In accordance with the invention, the tasks are solved by an automatic transmission as described and claimed herein.

Accordingly, an automatic transmission is proposed, which features a housing, a total of eight rotatable shafts including one drive shaft and one output shaft, four individual planetary gear sets, and seven shift elements, the actuation of which leads to different transmission ratio relationships between the drive shaft and output shaft for the shifting of several forward gears and one reverse gear. Three of the shift elements are designed as brakes, and the other four shift elements are designed as clutches. Each of the four planetary gear sets features three different elements, thus one sun gear, one planetary gear carrier, and one ring gear.

With respect to the formation of shafts and the coupling of the individual elements of the planetary gear sets with each other, the following is proposed:

The first element of the second planetary gear set forms the first shaft formed as a drive shaft of the transmission.

The second element of the third planetary gear sets forms the second shaft designed as an output shaft of the transmission.

The second element of the first planetary gear set forms the third shaft.

The first element of the first planetary gear set forms the fourth shaft.

The third element of the third planetary gear set forms the fifth shaft.

The third element of the first planetary gear set, the second element of the second planetary gear set and the first element of the third planetary gear set are constantly connected to each other and together form the sixth shaft.

The third element of the second planetary gear set forms the seventh shaft.

With respect to the connection of the individual shift elements to the shafts and to the housing, the following is proposed:

The first brake is arranged in the power flow between the third shaft and the housing, such that, if the first brake is engaged, the third shaft or the second element of the first planetary gear set, as the case may be, is at a standstill.

The second brake is arranged in the power flow between the fourth shaft and the housing, such that, if the second brake is engaged, the fourth shaft or the first element of the first planetary gear set, as the case may be, is at a standstill.

The third brake is arranged in the power flow between the fifth shaft and the housing, such that, if the third brake is engaged, the fifth shaft or the third element of the third planetary gear set, as the case may be, is at a standstill.

The first clutch is arranged in the power flow between the third and the seventh shafts, such that, if the first clutch is engaged, the third and seventh shaft, thus the second element of the first planetary gear set and the third element of the second planetary gear set, rotate with the same rotational speed.

The second clutch is arranged in the power flow between the first and third shafts, such that, if the second clutch is engaged, the third shaft or the second element of the first planetary gear set, as the case may be, rotates with the rotational speed of the drive shaft.

The third clutch is constantly connected to the eighth shaft. The fourth clutch is arranged in the power flow between the first and fourth shafts, such that, if the fourth clutch is engaged, the fourth shaft or the first element of the first planetary gear set, as the case may be, rotates with the rotational speed of the drive shaft.

Thereby, with the formulation of "constantly connected" in connection with the coupling of a shift element to a planetary gear set, it must be understood that the input or output element of the respective shift element is connected to one of the elements of the respective planetary gear set through a torque-proof or torsionally flexible connection, such that there is always a fixed rotational speed relationship between this planetary gear set and the input or output element of this shift element.

In connection with the coupling of a shift element to a shaft, with the formulation of "constantly connected," it must be understood that the input or output element of the respective shift element is directly connected to the respective shaft through a torque-proof or torsionally flexible connection, such that there is always a fixed rotational speed relationship between this shaft and the input or output element of this shift element.

In connection with the coupling of a planetary gear set to another planetary gear set, with the formulation of "constantly connected," it must be understood that one of the elements of the respective planetary gear set is directly connected to one of the elements of the respective other planetary gear set through a torque-proof or torsionally flexible connection, such that there is always a fixed rotational speed relationship between these two planetary gear set elements.

In connection with the coupling of an element of a planetary gear set or a shift element on the housing, with the formulation of "constantly connected," it must be understood that the respective element of the planetary gear set or the output element of the respective shift element, as the case may be, is directly connected to the housing through a torque-proof or torsionally flexible connection, such that the respective element of the planetary gear set or the output element of each shift element is always at a standstill.

Thus, compared to the state of the art, the automatic transmission in accordance with the invention features its own kinematics, whereas eleven forward gears and one reverse gear can be shifted with the use of seven shift elements. Specifically, the kinematics of the automatic transmission in accordance with the invention differs from U.S. Pat. No. 8,591,376 B1, conforming to this type, in that the second element of the second planetary gear set is constantly connected to the sixth shaft, that the third element of the second planetary gear set now forms the seventh shaft, and that the first clutch is now arranged in the power flow between the third and seventh shafts.

In a preferred first embodiment of the invention, it is proposed that the first element of the fourth planetary gear set is constantly connected to the sixth shaft, that the second element of the fourth planetary gear set forms the eighth shaft, that the third element of the fourth planetary gear set with the second shaft is connected, and that the third clutch is arranged in the power flow between the first and eighth shaft. Thus, the eighth shaft or the second element of the fourth planetary gear set, as the case may be, rotates with the same rotational speed of the drive shaft, if the third clutch is engaged.

In a preferred second embodiment of the invention, it is proposed that the first element of the fourth planetary gear set is constantly connected to the sixth shaft, that the third element of the fourth planetary gear set forms the eighth shaft, that the second element of the fourth planetary gear is constantly connected to the first shaft, and that the third clutch is connected in the power flow between the second and eighth shafts. Thus, the second element of the fourth planetary gear set constantly rotates with the rotational speed of the drive shaft. If the third shift element is engaged, the second and eighth shafts rotate with the same rotational speed.

In a preferred third embodiment of the invention, it is proposed that the first element of the fourth planetary gear set forms the eighth shaft, that the second element of the fourth planetary gear set is constantly connected to the first shaft, that the third element of the fourth planetary gear set is constantly connected to the second shaft, and that the third clutch is connected in the power flow between the sixth and eighth shafts. Thus, the second element of the fourth planetary gear set constantly rotates with the rotational speed of the drive shaft, while the third element of the fourth planetary gear set constantly rotates with the rotational speed of the output shaft. If the third shift element is engaged, the sixth and eighth shafts rotate with the same rotational speed.

Preferably, with the transmission in accordance with the invention, three of the seven shift elements are engaged in any gear. Upon a change from one gear to the subsequent higher or lower gear, only one of the previously engaged shift elements is disengaged and one previously open shift element is engaged, such that, upon each sequential upshift and downshift by one gear, so-called "group gearshifts" are avoided.

In order to represent eleven forward gears and one reverse gear with seven shift elements, such a transmission may feature the following shifting logic or gear logic:

In the first forward gear, the first brake, the third brake and the first clutch are engaged or transfer torque.

In the second forward gear, the second brake, the third brake and the first clutch are engaged or transfer torque.

In the third forward gear, the third brake, the first clutch and the second clutch are engaged or transfer torque.

In the fourth forward gear, the second brake, the third brake and the second clutch are engaged or transfer torque.

In the fifth forward gear, the third brake, the second clutch and the third clutch are engaged or transfer torque.

In the sixth forward gear, the second brake, the second clutch and the third clutch are engaged or transfer torque.

In the seventh forward gear, the first, second and third clutches are engaged or transfer torque.

In the eighth forward gear, the second brake, the first clutch and the third clutch are engaged or transfer torque.

In the ninth forward gear, the first brake, the first clutch and the third clutch are engaged or transfer torque.

In the tenth forward gear, the first brake, the second brake and the third clutch are engaged or transfer torque.

In the eleventh forward gear, the first brake, the third clutch and the fourth clutch are engaged or transfer torque.

In the reverse gear, the first brake, the third brake and the fourth clutch are engaged or transfer torque.

All four planetary gear sets are preferably designed as so-called "negative planetary gear sets," the respective planetary gears of which mesh with the sun gear and the ring gear of the respective planetary gear set.

As an alternative to the design of the gear set system with four individual negative planetary gear sets, an individual negative planetary gear set may be replaced by a so-called "positive planetary gear set," which enables an alternative spatial arrangement of the individual shift elements inside the transmission housing. As is well known, a positive planetary gear set features a planetary gear carrier ("bar") with inner and outer planetary gears rotatably mounted on it, whereas each of the inner planetary gears meshes with each outer planetary gear and with the sun gear of the positive planetary gear set, while each of the outer planetary gears meshes with each inner planetary gear and with the ring gear of the positive planetary gear set. As an alternative to the design of the gear set system with four individual negative planetary gear sets, several of the negative planetary gear sets may also be replaced by positive planetary gear sets.

To ensure the same kinematics of the claimed gear set system, it is provided that the first element of each negative planetary gear set and the first element of each positive planetary gear set is formed as a sun gear, that the second element of each negative planetary gear set is formed as a planetary gear carrier, while the second element of each positive planetary gear set is formed as a ring gear, and that the third element of each negative planetary gear set is formed as a ring gear, while the third element of each positive planetary gear set is formed as a planetary gear carrier.

With respect to the spatial arrangement of the four planetary gear sets in the housing of the automatic transmission, in one embodiment it is proposed to arrange all four planetary gear sets coaxially next to each other in the defined order of "first, second, third, fourth planetary gear set," by which it is possible to, in a simple manner and with minimal leakage, supply all clutches with the means of pressure necessary for hydraulic actuation. For an application with a drive shaft and an output shaft that pass coaxially to each other, in this case, it is useful that the first planetary gear set is the planetary gear set of the planetary gear set group turned towards the drive of the automatic transmission.

In conjunction with this order of planetary gear sets of "first, second, third, fourth planetary gear set," as an advantageous spatial arrangement of the shift elements, it is proposed:
- to arrange the first brake of the first shift element, viewed spatially, at least partially on that side of the first planetary gear set that is turned away (opposite) from the second planetary gear set, and/or at least partially radially above the first planetary gear set;
- to arrange the second brake, viewed spatially, on that side of the first planetary gear set that is turned away from the second planetary gear set, preferably on that side of the first brake that is turned away from the first and second planetary gear sets;
- to arrange the third brake, viewed spatially, at least partially radially above the third planetary gear set;
- to arrange the first clutch, viewed spatially, in an area axially between the first and second planetary gear sets;
- to arrange the second clutch, viewed spatially, on that side of the first planetary gear set that is turned away from the second planetary gear set, preferably near the drive of the transmission;
- depending on the kinematic connection of the third clutch to the other transmission components, to arrange the third clutch, viewed spatially, on that side of the fourth planetary gear set that is turned away from the third planetary gear set, or, viewed spatially, at least partially in an area radially above the fourth planetary gear set, but, viewed spatially, in an area axially between the third and fourth planetary gear sets;
- and to arrange the fourth clutch, viewed spatially, on that side of the first planetary gear set that is turned away from the second planetary gear set, for example, in an area axially between the second clutch and the second brake or, alternatively, in an area radially above the second clutch.

Of course, other spatial arrangements of the four planetary gear sets and the seven shift elements in the housing of the automatic transmission are possible.

In practice, all proposed designs and arrangements for an automatic transmission in accordance with the invention feature, in particular for passenger cars, useful transmission ratios with very large overall spreads in terms of the gear gradation that is reasonable for drivability, which has positive effects on the intended low consumption of fuel. In addition, the automatic transmission in accordance with the invention is characterized by, measured by the number of gears, a low number of shift elements and comparatively low construction costs. Furthermore, with the automatic transmission in accordance with the invention, a good degree of efficiency arises in all gears; on the one hand, this is a consequence of low drag losses, since three of the shift elements mesh in each gear; on the other hand, this is also the consequence of low gearing losses in the simply structured individual planetary gear sets.

In an advantageous manner, with the automatic transmission in accordance with the invention, it is possible to realize a start-up of the vehicle both with a start-up element external to the transmission and with a frictional shift element internal to the transmission. In a manner known per se, a start-up element external to the transmission may be formed as a hydrodynamic converter, as a so-called "dry start-up clutch," as a so-called "wet start-up clutch," as a magnetic powder clutch or as a centrifugal clutch. As an alternative to the arrangement of such a start-up element in the power flow between drive motor and the transmission, the start-up element external to the transmission may also be arranged in the power flow behind the transmission, whereas, in this case, the drive shaft of the transmission is constantly connected to the crank shaft of the drive motor in a torsion-proof or torsionally flexible manner. In particular, the third brake, which transfers torque in the first five forward gears and in the reverse gear, is suitable as the start-up element internal to the transmission.

In addition, the automatic transmission in accordance with the invention is designed to enable adaptability to the various drive train arrangements both in the direction of the power flow and in spatial terms. Thus, with the same transmission diagram, depending on the stationary transmission ratio of the individual planetary gears, various gear jumps arise, such that an application-specific or vehicle-specific variation is made possible. Furthermore, without any special structural measures, it is possible to arrange the input and the output of the transmission either coaxially to each other or axially parallel to each other. An axle differential and/or a distributor differential may be arranged on the input side or on the output side of the transmission. It is also possible to provide additional freewheels at each suitable point of the multi-speed transmission, in particular by forming, if applicable, a connection between one shaft and the housing or by two shafts. Moreover, a wear-free brake such as a hydraulic or electric retarder or the like may be arranged at each shaft, preferably at the drive shaft or at the output shaft; this is of particular importance for use in commercial vehicles. Moreover, a power take-off may be provided for the drive of additional power units at each shaft, preferably at the drive shaft or the output shaft. An additional advantage of the automatic transmission in accordance with the invention is that an electric motor can be installed at each shaft as a generator and/or as an additional drive motor.

The shift elements that are used may be formed as power-shifting clutches or brakes. In particular, force-fitting clutches or brakes—such as multi-disk clutches, band brakes and/or cone clutches—may be used. Moreover, positive-locking brakes and/or clutches—such as synchronizations or claw couplings—may be used as shift elements.

BRIEF DESCRIPTION OF DRAWINGS

In the following, the invention is more specifically described on the basis of the sample drawings. Thereby, the same or comparable components are provided with the same reference signs. The following is shown.

DETAILED DESCRIPTION

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

Figure 1:
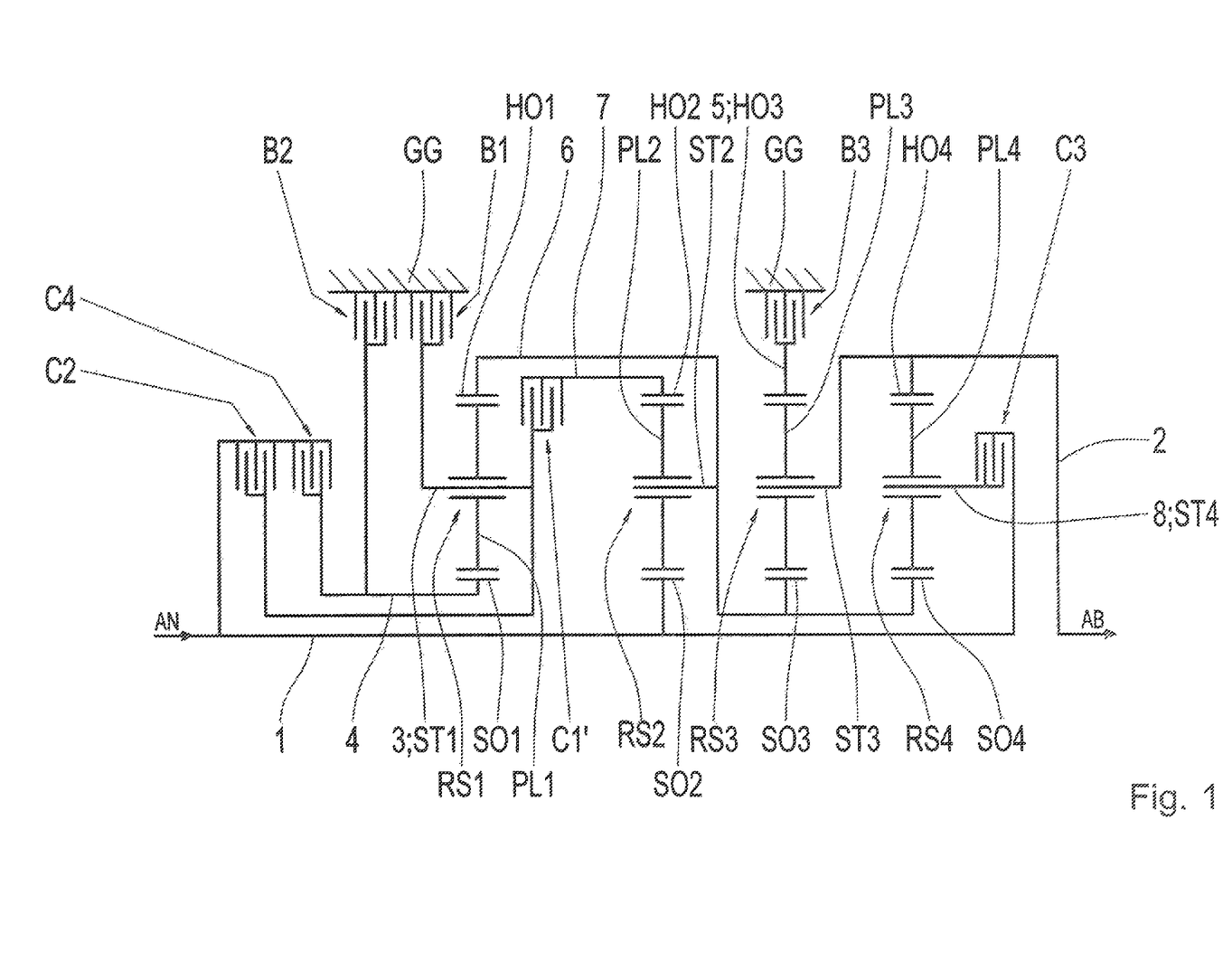
FIG. 1 is a schematic presentation of a first embodiment of an automatic transmission in accordance with the invention.

FIG. 1 presents the gear set diagram of a first embodiment of an automatic transmission in accordance with the invention. The transmission comprises, including a drive shaft AN and an output shaft AB, eight rotatable shafts 1 to 8, four planetary gear sets RS1, RS2, RS3, RS4 and seven shift elements B1, B2, B3, C1, C2, C3, C4, which are all arranged in a housing GG of the transmission. All four planetary gear sets RS1, RS2, RS3, RS4 are formed as simple negative planetary gear sets, each of which comprises a first, a second and a third element. As is well known, a negative planetary gear features planetary gears that mesh with the sun gear and ring gear of the planetary set. Each of the third elements of the four planetary gear sets RS1, RS2, RS3, RS4 is formed as a ring gear and is designated with HO1, HO2, HO3 and HO4. Each of the first elements of the four planetary gear sets RS1, RS2, RS3, RS4 is formed as a sun gear and is designated with SO1, SO2, SO3, SO4. Each of the second elements of the four planetary gear sets RS1, RS2, RS3, RS4 is formed as a planetary gear carrier and is designated with ST1, ST2, ST3 and ST4. The planetary gears rotatably mounted on the planetary gear carriers ST1, ST2, ST3 and ST4 are designated with PL1, PL2, PL3 and PL4.

The shift elements B1, B2 and B3 are formed as brakes, which in the embodiment shown are all designed as frictional-locking, shiftable multi-disk brakes, and may also be designed in another arrangement as frictional-locking, shiftable band brakes or, for example, as positive-locking, shiftable claw brakes or cone brakes. The other shift elements C1, C2, C3 and C4 are formed as clutches, which in the embodiment shown are all designed as a frictional-locking, shiftable multi-disk clutch, and may also be designed in another arrangement, for example, as a positive-locking, shiftable claw coupling or cone clutch. With this total of seven shift elements, a selective shifting of eleven forward gears and one reverse gear can be realized, which will be described in more detail below on the basis of FIG. 4.

With respect to the coupling of the individual elements of the four planetary gear sets RS1, RS2, RS3, RS4 to one another and for the input and output shafts AN, AB, with the embodiment in accordance with FIG. 1, the following is provided:

The sun gear SO2 of the second planetary gear set RS2 forms the first shaft 1 of the transmission, designed as the drive shaft AN of the transmission.

The planetary gear carrier ST3 of the third planetary gear set RS3 and the ring gear HO4 of the fourth planetary gear set RS4 are constantly connected to each other (in the manner of a clutch shaft) and together form the second shaft 2 of the transmission designed as the output shaft AB of the transmission.

The planetary gear carrier ST1 of the first planetary gear set RS1 forms the third shaft 3 of the transmission.

The sun gear SO1 of the first planetary gear set RS1 forms the fourth shaft 4 of the transmission.

The ring gear HO3 of the third planetary gear set RS3 forms the fifth shaft 5 of the transmission.

The ring gear HO1 of the first planetary gear set RS1, the planetary gear carrier ST2 of the second planetary gear set RS2, the sun gear SO3 of the third planetary gear set RS3 and the sun gear SO4 of the fourth planetary gear set RS4 are constantly connected to each other (in the manner of a clutch shaft) and form the sixth shaft 6 of the transmission.

The ring gear HO2 of the second planetary gear set RS2 forms the seventh shaft 7 of the transmission.

The planetary gear carrier ST4 of the fourth planetary gear set RS4 forms the eighth shaft 8 of the transmission.

With respect to the coupling of the three brakes B1, B2, B3 to the described eight shafts 1 to 8 of the transmission and to the housing GG with the automatic transmission in accordance with the invention shown in FIG. 1, the following is provided:

The first brake B1 is arranged in the power flow between the third shaft 3 and the housing GG, such that the planetary gear carrier ST1 of the first planetary gear set RS1 can be fixed to the housing GG by engaging the first brake B1.

The second brake B2 is arranged in the power flow between the fourth shaft 4 and the housing GG, such that the sun gear SO2 of the first planetary gear set RS1 can be fixed to the housing GG by engaging the second brake B2.

The third brake B3 is arranged in the power flow between the fifth shaft 5 and the housing GG, such that the ring gear HO3 of the third planetary gear set RS3 can be fixed to the housing GG by engaging the third brake B3.

With respect to the coupling of the four clutches C1, C2, C3, C4 to the described eight shafts 1 to 8 of the transmission, with the automatic transmission in accordance with the invention shown in FIG. 1, the following is provided:

The first clutch is arranged in the power flow between the third shaft 3 and the seventh shaft 7, such that, if the first clutch C1 is engaged, the planetary gear carrier ST1 of the first planetary gear set RS1 and the ring gear HO2 of the second planetary gear set SO2 rotate with the same rotational speed.

The second clutch C2 is arranged in the power flow between the first shaft 1 and the third shaft 3, such that, if the second clutch C2 is engaged, the planetary gear carrier ST1 of the first planetary gear set RS1 rotates with the same rotational speed of the drive shaft AN.

The third clutch C3 is arranged in the power flow between the first shaft 1 and the eighth shaft 8, such that, if the third clutch C3 is engaged, the planetary gear carrier ST4 of the fourth planetary gear set SO4 rotates with the same rotational speed of the drive shaft AN.

The fourth clutch C4 is arranged in the power flow between the first shaft 1 and the fourth shaft 4, such that, if the fourth clutch C4 is engaged, the sun gear SO1 of the first planetary gear set RS1 rotates with the same rotational speed of the drive shaft AN.

Thus, in the embodiment shown in FIG. 1, the first shaft 1 is constantly connected to three shift elements (clutches C2, C3, C4), the second shaft 2 is not constantly connected to any of the shift elements, the third shaft 3 is constantly connected to three shift elements (brake B1, clutch C1, clutch C2), the fourth shaft 4 is constantly connected to two shift elements (brake B2, clutch C4), the fifth shaft 5 is constantly connected to one shift element (brake B3), the sixth shaft 6 is not constantly connected to any of the shift elements, the seventh shaft 7 is constantly connected to one shift element (clutch C1), the eighth shaft 8 is constantly connected to one shift element (clutch C3).

Further, in the embodiment shown in FIG. 1, the first planetary gear set RS1 is constantly connected to five shift elements (brake B1, brake B2, clutch C1, clutch C2, clutch C4), the second planetary gear set RS2 is constantly connected to three shift elements (clutch C1, clutch C2, clutch C4), the third planetary gear set RS3 is constantly connected to one shift element (brake B3) and the fourth planetary gear set RS4 is constantly connected to one shift element (clutch C3).

In the embodiment shown in FIG. 1, the four planetary gear sets RS1, RS2, RS3 RS4 are arranged, viewed in an axial direction, coaxially one behind the other in the defined order of "RS1, RS2, RS3, RS4," whereas the drive shaft AN and the output shaft AB are arranged coaxially to each other, and the first planetary gear set RS1 forms the gear set of the automatic transmission close to the drive and the fourth planetary gear set RS4 forms the gear set of the automotive transmission close to the output. This arrangement is favorable for the spatial arrangement of the shift elements, in particular favorable with respect to the feed of pressure and lubricant to the shift elements and favorable with respect to the feed of lubricant to the planetary gear sets.

In principle, the spatial arrangement of the shift elements within the transmission is variable within wide limits, and is limited only by the dimensions and the external shaping of the transmission housing GG. Accordingly, the arrangement of components shown in FIG. 1 is expressly understood to be just one of many possible variants of the arrangement of the components.

In the embodiment shown in FIG. 1, the first and second brakes B1, B2 are both arranged, viewed spatially, axially next to the first planetary gear set RS1 (arranged on the input side of the transmission housing), axially next to each other on the side of the first planetary gear set RS1 that is turned away from the second planetary gear set RS2, whereas the first brake B1 is arranged closer to the first planetary gear set RS1 than the second brake B2. Both brakes B1 and B2 are arranged on the same diameter, specifically on a diameter greater than the diameter of the ring gear HO1. This allows for the use of common parts in the assembly of the multi-disk. In a simple manner, the two brakes B1 and B2 may be supplied with means of pressure and coolant by the transmission housing GG. Thus, in a structurally simple manner, the outer multi-disk carrier of the brakes B1, B2 and the servomechanisms of the two brakes B1, B2 provided for actuating the respective associated multi-disk packs may be integrated into a section of a housing wall of the housing GG that is close to the drive.

Alternatively, by way of derogation from FIG. 1, both brakes B1 and B2 may also be integrated into a cover of the housing GG that is close to the drive.

In an additional alternative, the first brake B1 may be arranged at least with its multi-disk pack, viewed spatially, also radially above the first planetary gear set RS1 or radially above the second planetary gear set RS2, in order to represent a transmission that is axially shorter compared to FIG. 1. If the first brake B1 is arranged, viewed spatially, in an area radially above the second planetary gear set RS2, the second brake B2 may be arranged, viewed spatially, in an area radially above the first planetary gear set RS1, which further reduces the axial length of the transmission.

As also shown in FIG. 1, the third brake B3 is arranged, viewed spatially, at least with its multi-disk pack in an area radially above the third planetary gear set RS3. In accordance with the kinematic coupling to the fifth shaft 5, which is formed here by the ring gear HO3 of the third planetary gear set RS3, the inner multi-disk carrier of the third brake B3 and the ring gear HO3 of the third planetary gear set RS3 may be designed, in an advantageous manner in terms of production technology, as a one-piece component. Thus, in a structurally simple manner, the outer multi-disk carrier of the third brake B3 and the servomechanism provided for actuating the multi-disk pack of the third brake B3 may be integrated into a section of the housing wall of the housing GG.

As also shown in FIG. 1, the first clutch C1 is arranged, viewed spatially, in an area axially between the first planetary gear set RS1 and the second planetary gear set RS2. The first clutch C1 may be supplied, comparatively with minimal leakage loss, with means of pressure and coolant by the drive shaft AN coming through a section of the fourth shaft 4 rotatably mounted on the drive shaft AN (shaft 1), which on its part is connected to an inner multi-disk carrier of the first clutch C1.

As also shown in FIG. 1, the second and fourth clutches C2, C4 are arranged, viewed spatially, both axially next to the first planetary gear set RS1 (arranged on the input side of the transmission housing), in the manner of a so-called "dual clutch," axially next to each other on the side of the first planetary gear set RS1 that is turned away from the second planetary gear set RS2, whereas the fourth clutch C4 is arranged closer to the first planetary gear set RS1 as the second clutch C2. Thereby, the multi-disk pack of the second clutch C2 features the same diameter as the multi-disk pack of the fourth clutch C4, which allows for the use of common parts in the assembly of the multi-disk. In addition, in an advantageous manner in terms of production technology, a common outer multi-disk carrier can be provided for the two clutches C2 and C4; it is constantly connected to the first shaft 1, and thus constantly rotates with the rotational speed of the drive shaft AN. Therefore, the two clutches C2, C4 may be supplied with means of pressure and coolant through the drive shaft AN (first shaft 1) with extremely minimal leakage loss.

In order to reduce the axial length of the transmission, in a structure alternative to FIG. 1, the multi-disk pack of the fourth clutch C4 may also be arranged, viewed spatially, radially above the multi-disk pack of the second clutch C2, whereas the common multi-disk carrier connected to the drive shaft AN is preferably formed as an inner multi-disk carrier for the now radially outer clutch C4, and as an outer multi-disk carrier for the now radially inner clutch C2.

As also shown in FIG. 1, the third clutch C3 is arranged, viewed spatially, in an area axially next to the fourth planetary gear set RS4 on that side of the fourth planetary gear set RS4 that is turned away from the third planetary gear set RS3. Thereby, the inner multi-disk carrier of the third clutch C3 forms a section of the eighth shaft 8; here, it is constantly connected to the planetary gear carrier ST4 of the fourth planetary gear set RS4. The outer multi-disk carrier of the third clutch C3 forms a section of the first shaft 1, and therefore constantly rotates with the rotational speed of the drive shaft AN. Therefore, the third clutch C3 may be supplied with means of pressure and coolant through the drive shaft AN (first shaft 1) with extremely minimal leakage loss.

As already indicated, the spatial arrangement of the shift elements shown in FIG. 1 must be understood as an example. Thus, depending on the installation space available for the installation of the transmission of the vehicle, it may be expedient to arrange individual or several of the seven shift elements in a manner different from the embodiment shown here.

Figure 2:
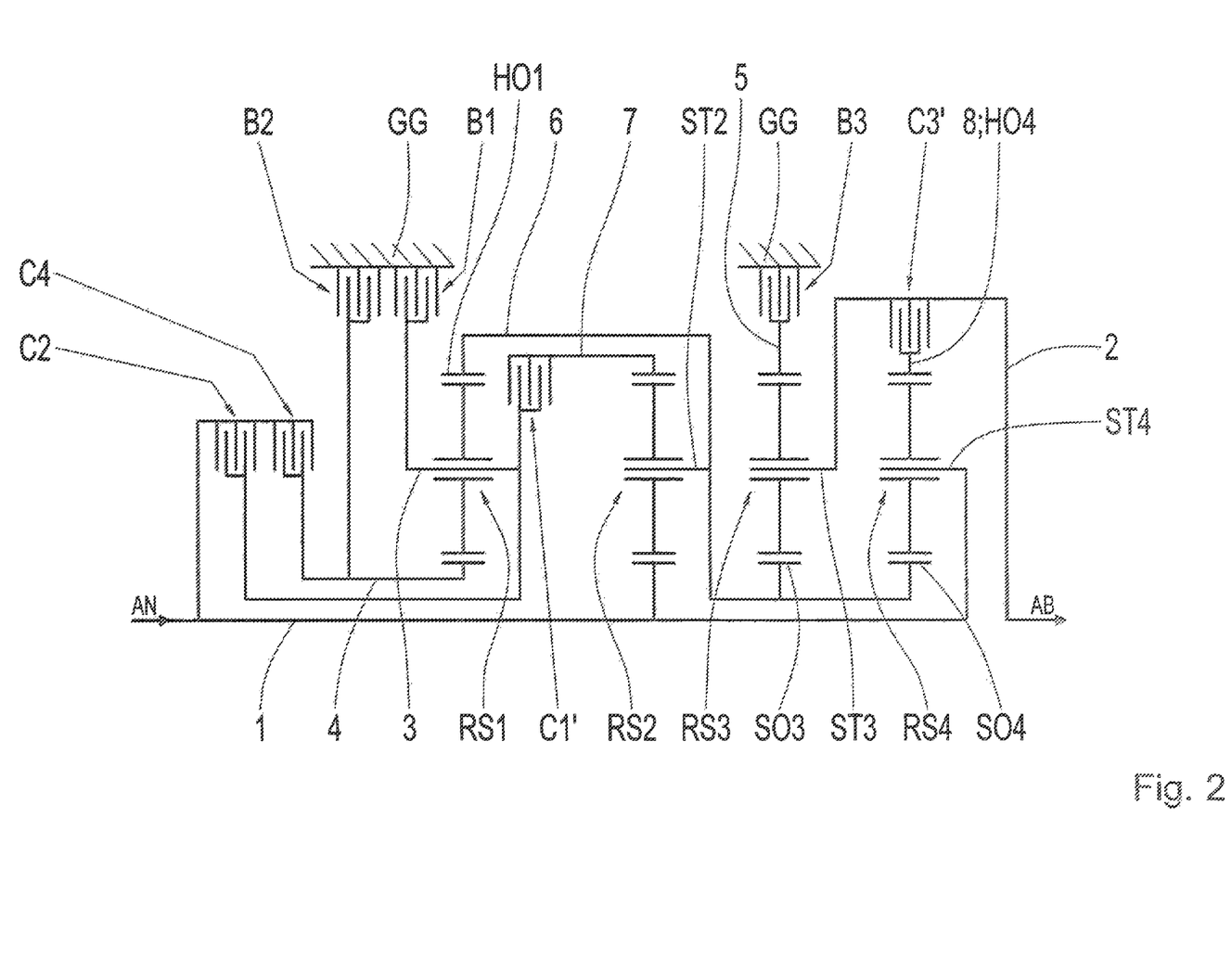
FIG. 2 is a schematic presentation of a second embodiment of an automatic transmission in accordance with the invention.

FIG. 2 shows the gear set diagram of a second embodiment of an automatic transmission in accordance with the invention, derived from the transmission diagram in accordance with FIG. 1. The differences with the transmission diagram in accordance with FIG. 1 concern only the kinematic coupling of the fourth planetary gear set RS4 and the third clutch C3 to the other transmission components. Therefore, for the avoidance of repetitions, the following description of FIG. 2 is limited to such differences.

As shown in FIG. 2, the sun gear SO4 of the fourth planetary gear set RS4, without any change, forms one section of the sixth shaft 6, and is thus, without any change, constantly connected to the sun gear SO3 of the third planetary gear set RS3, is constantly connected to the planetary gear carrier ST2 of the second planetary gear set RS2 and is constantly connected to the ring gear HO1 the first planetary gear set RS1. In contrast to FIG. 1, the planetary gear carrier ST4 of the fourth planetary gear set RS4 is now constantly connected to the first shaft 1, and therefore constantly rotates with the rotational speed of the drive shaft AN. In contrast to FIG. 1, the ring gear HO4 of the fourth planetary gear set RS4 now forms the eighth shaft 8 of the transmission, whereas the third clutch C3 is now arranged in the power flow between such eighth shaft 8 and the second shaft 2. The second shaft 2 designed as an output shaft AB on its part is now still constantly connected to the planetary gear carrier ST3 of the third planetary gear set RS3.

As also shown in FIG. 2, all four planetary gear sets RS1 to RS4 are formed, as in FIG. 1, as simple negative planetary gear sets, and are arranged, viewed spatially, coaxially next to each other with the defined order of "first, second, third, fourth planetary gear set" (thus, the arrangement of "RS1-RS2-RS3-RS4"). Moreover, the spatial arrangement of the three brakes B1, B2, B3 and the spatial arrangement of the three clutches C1, C2, C4 were taken from FIG. 1 without any change.

In contrast to FIG. 1, the third clutch C3 in FIG. 2 is now arranged, viewed spatially, at least with its multi-disk pack in an area above the fourth planetary gear set RS4. In accordance with the kinematic coupling to the eighth shaft 8, which is formed here by the ring gear HO4 of the fourth planetary gear set RS4, the inner multi-disk carrier of the third clutch C3 and the ring gear HO4 of the fourth planetary gear set RS4 may be designed, in an advantageous manner in terms of production technology, as a one-piece component. The outer multi-disk carrier of the third clutch C3 forms a section of the second shaft 2, and therefore constantly rotates with the rotational speed of the output shaft AB. Therefore, the third clutches C3 may be supplied with means of pressure and coolant through the output shaft AB (second shaft 2) with extremely minimal leakage loss.

Figure 3:
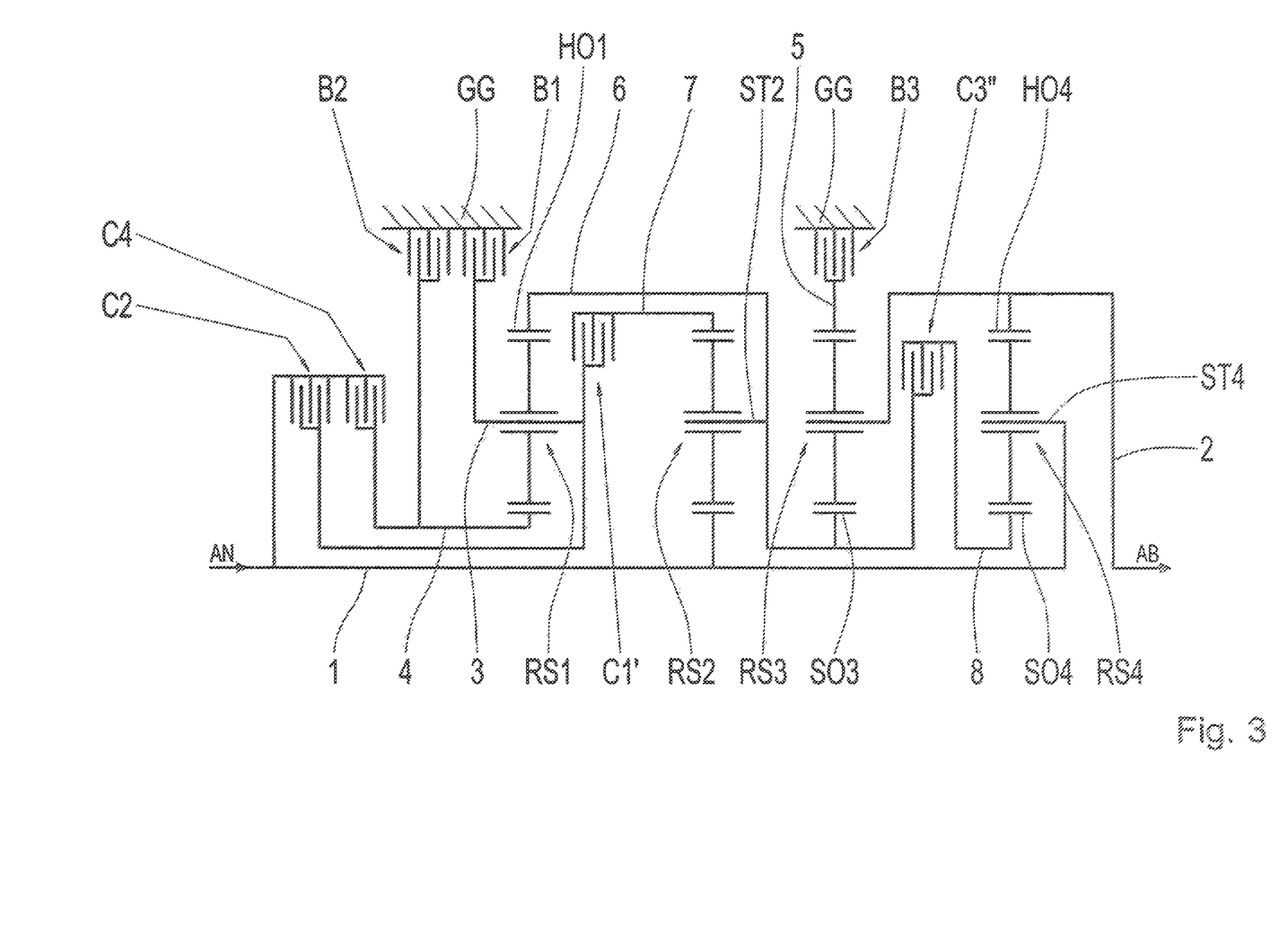
FIG. 3 is a schematic presentation of a third embodiment of an automatic transmission in accordance with the invention.

FIG. 3 shows the gear set diagram of a third embodiment of an automatic transmission in accordance with the invention, derived from the transmission diagram in accordance with FIG. 1. The differences with the transmission diagram in accordance with FIG. 1 concern only the kinematic coupling of the fourth first planetary gear set RS4 and the third clutch C3 to the other transmission components. Therefore, for the avoidance of repetitions, the following description of FIG. 2 is limited to such differences.

As shown in FIG. 3, the ring gear HO4 of the fourth planetary gear set RS4, without any change, forms one section of the second shaft 2, and is thus, without any change, constantly connected to the planetary gear carrier ST3 of the third planetary gear set RS3, and rotates constantly with rotational speed of output shaft AB. In contrast to FIG. 1, the planetary gear carrier ST4 of the fourth planetary gear set RS4 is now constantly connected to the first shaft 1, and therefore constantly rotates with the rotational speed of the drive shaft AN. If, in contrast to FIG. 1, the sun gear SO4 of the fourth planetary gear set RS4 now forms the eighth shaft 8 of the transmission, whereas the third clutch C3 is now arranged in the power flow between such eighth shaft 8 and the sixth shaft 6. The sixth shaft 6 on its part now constantly connects the ring gear HO1 of the first planetary gear set RS1 and the planetary gear carrier ST2 of the second planetary gear set RS2 and the sun gear SO3 of the third planetary gear set RS3 to each other.

As also shown in FIG. 3, all four planetary gear sets RS1 to RS4 are formed, as in FIG. 1, as simple negative planetary gear sets, and are arranged, viewed spatially, coaxially next to each other with the defined order of "first, second, third, fourth planetary gear set" (thus, the arrangement of "RS1-RS2-RS3-RS4"). Moreover, the spatial arrangement of the three brakes B1, B2, B3 and the spatial arrangement of the three clutches C1, C2, C4 were taken from FIG. 1 without any change.

In contrast to FIG. 1, the third clutch C3 in FIG. 3 is now arranged, viewed spatially, in an area axially between the third planetary gear set RS3 and the fourth planetary gear set RS4. By way of example, the outer multi-disk carrier of the third clutch C3 forms one section of the eighth shaft 8 and, in accordance with the kinematics of the transmission, is constantly connected to the sun gear SO4 of the fourth planetary gear set RS4, while the inner multi-disk carrier of the third clutch C3 forms one section of the sixth shaft 6. Accordingly, the third clutch C3 may be supplied with means of pressure and coolant, here comparatively with minimal leakage loss, by the drive shaft AN or the first shaft 1, as the case may be, coming through the outer multi-disk carrier of the third clutch C3 rotatably mounted on the first shaft 1.

Figure 4:
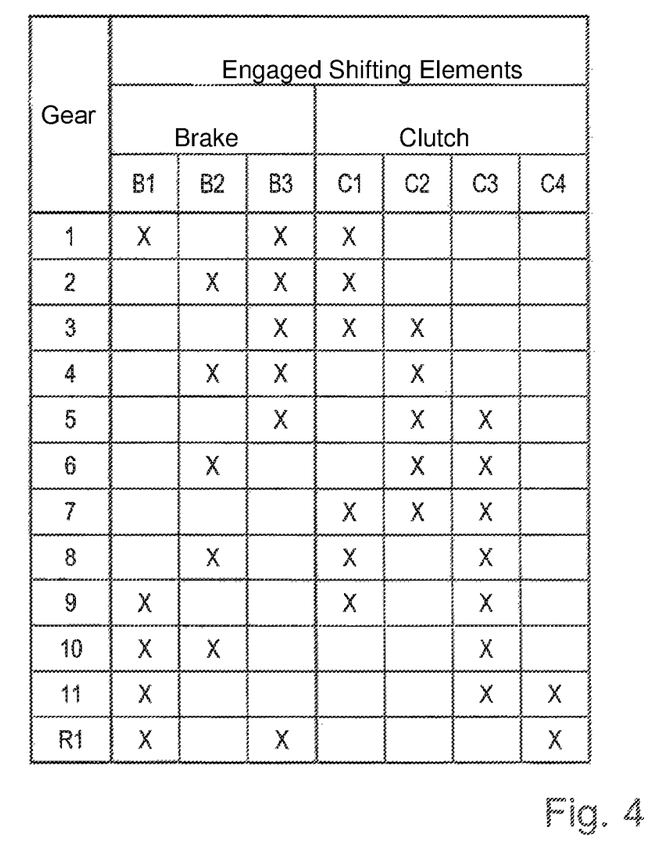
FIG. 4 is an exemplary shifting diagram for the automatic transmission in accordance with FIGS. 1 to 3.

FIG. 4 presents an exemplary shifting diagram of the transmission in accordance with the invention in accordance with FIGS. 1 to 3. In each gear, three shift elements are engaged and three shift elements open, which—a result of the minimization of drag losses that must arise on open frictional shift elements—has a positive effect on the efficiency of the transmission. In addition to the shifting logic, it may also be taken from the shifting diagram that, upon a sequential shifting operation, thus upon upshifts and downshifts by one gear, so-called "group gearshifts" can be avoided, since two gears adjacent in the shifting logic always jointly use two shift elements. Overall, at least eleven forward gears and at least one reverse gear can be shifted with transmission ratios that are sensible in practice.

As shown in FIG. 4, in the first reverse gear, the brake B1, the brake B3 and the clutch C1 transfer torque, in the second forward gear, the brake B2, the brake B3 and the clutch C1 transfer torque, in the third forward gear, the brake B3, the clutch C1 and the clutch C2 transfer torque, in the fourth forward gear, the brake B2, the brake B3 and the clutch C2 transfer torque, in the fifth forward gear, the brake B3, the clutch C2 and the clutch C3 transfer torque, in the sixth forward gear, the brake B2, the clutch C2 and the clutch C3 transfer torque, in the seventh forward gear, the clutch C1, the clutch C2 and the clutch C3 transfer torque, in the eighth forward gear, the brake B2, the clutch C1 and the clutch C3 transfer torque, in the ninth forward gear, the brake B1, the clutch C1 and the clutch C3 transfer torque, in the tenth forward gear, the brake B1, the brake B2 and the clutch C3 transfer torque, in the eleventh forward gear, the brake B1, the clutch C3 and the clutch C4 transfer torque. In the reverse gear, the brake B1, the brake B3 and the clutch C4 transfer torque.

Of course, the transmission diagrams previously presented in FIGS. 1 to 3 can also be presented with a different spatial arrangement of the four planetary gear sets RS1, RS2, RS3, RS4, without changing the respective kinematics of the transmission. Such can be particularly sensible if, with the transmission, the drive shaft AN and the output shaft AB are not arranged coaxially with each other, as this is the case, for example, with a so-called "front-transverse installation" in the vehicle.

Moreover, the spatial arrangements of the shift elements within the transmission housing previously proposed in FIGS. 1 to 3 have an exemplary nature. If necessary and depending on the given structural options, the specialist will also realize meaningful alternatives for the arrangement of the shift elements.

Figure 1A:
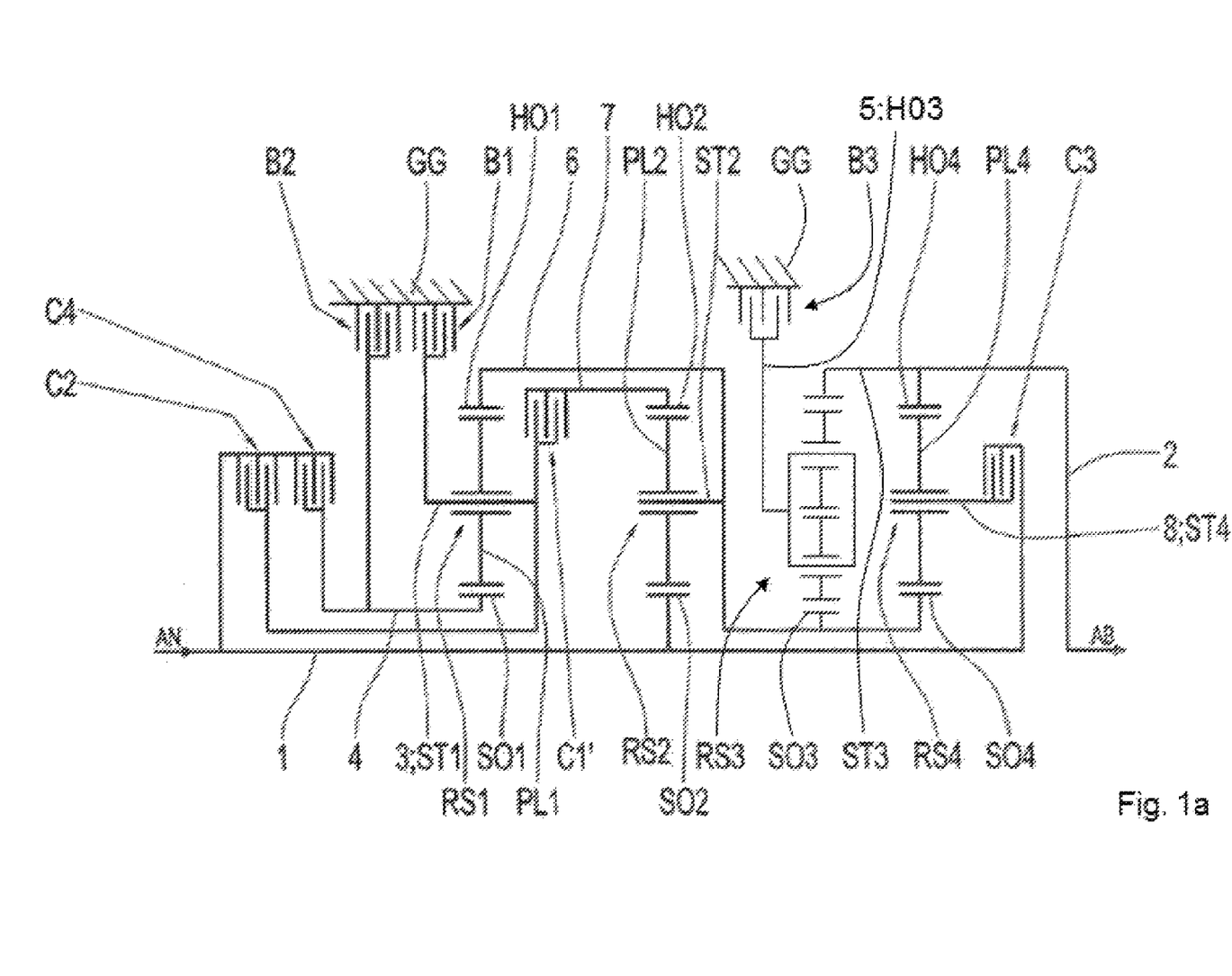
FIG. 1a is a schematic presentation of the embodiment of FIG. 1 with the third planetary gear set depicted as a positive planetary gear set.

Based on the finding that, in principle, it is possible to replace a so-called "negative planetary gear set" with a kinematically equivalent positive planetary gear set, to the extent that space allows for the coupling of the sun gear, planetary gear carrier and ring gear of such planetary gear set to the other planetary gear sets and shift elements and, where appropriate, to the housing, when necessary, the specialist will replace one or more of the four planetary gear sets designed as negative planetary gear sets shown in FIGS. 1 to 3 with one positive planetary gear set or several positive planetary gear sets. For example, FIG. 1a depicts the embodiment of FIG. 1 wherein the planetary gear set RS3 is a positive planetary gear set and the planetary gear sets RS1, RS2, and RS4 are negative planetary gear sets. As is well known, with a negative planetary gear set, each of its planetary gears meshes with both the sun gear and the ring gear, while, with a positive planetary gear set, each of its inner planetary gears meshes with one of its outer planetary gears and the sun gear, and each of its outer planetary gears meshes with one of its inner planetary gears and the ring gear, as schematically depicted in FIG. 1a.

Thereby, in order to maintain the kinematics of the gear set system, only the first element of each negative planetary gear set must be formed as a sun gear, the second element of each negative planetary gear set must be formed as a planetary gear carrier and the third element of each negative planetary gear set must be formed as a ring gear, while the first element of each positive planetary gear set must be formed as a sun gear, the second element of each positive planetary gear set must be formed as a ring gear and the third element of each positive planetary gear set must be formed as a planetary gear carrier. All such generated variants can be shifted with the shifting logic of eleven forward gears and one reverse gear shown in FIG. 4.

Modifications and variations can be made to the embodiments illustrated or described herein without departing from the scope and spirit of the invention as set forth in the appended claims.

REFERENCE SIGNS

1 First shaft
2 Second shaft
3 Third shaft
4 Fourth shaft
5 Fifth shaft
6 Sixth shaft
7 Seventh shaft
8 Eighth shaft
B1 First brake
B2 Second brake
B3 Third brake C1 First clutch
C2 Second clutch
C3 Third clutch
C4 Fourth clutch
AN Drive shaft
AB Output shaft
GG Housing
RS1 First planetary gear set
SO1 Sun gear of the first planetary gear set
ST1 Planetary gear carrier of the first planetary gear set
PL1 Planetary gears of the first planetary gear set
HO1 Ring gear of the first planetary gear set
RS2 Second planetary gear set
SO2 Sun gear of the second planetary gear set
ST2 Planetary gear carrier of the second planetary gear set
PL2 Planetary gears of the second planetary gear set
HO2 Ring gear of the second planetary gear set
RS3 Third planetary gear set
SO3 Sun gear of the third planetary gear set
ST3 Planetary gear carrier of the third planetary gear set
PL3 Planetary gears of the third planetary gear set
HO3 Ring gear of the third planetary gear set
RS4 Fourth planetary gear set
SO4 Sun gear of the fourth planetary gear set
ST4 Planetary gear carrier of the fourth planetary gear set
PL4 Planetary gears of the fourth planetary gear set
HO4 Ring gear of the fourth planetary gear set

The invention claimed is:

1. An automatic transmission for a motor vehicle, comprising:
   a housing (GG);
   eight rotatable shafts (1 to 8) including a drive shaft (AN) and an output shaft (AB);
   four individual planetary gear sets (RS1, RS2, RS3, RS4), each planetary gear set comprising a first element (SO1, SO2, SO3, SO4), a second element (ST1, ST2, ST3, ST4), and a third element (HO1, HO2, HO3, HO4);
   seven shift elements (B1, B2, B3, C1, C2, C3, C4), whereas three of the shift elements are designed as brakes (B1, B2, B3) and four of the shift elements are designed as clutches (C1, C2, C3, C4), and wherein selective engaging of the shift elements provides different transmission ratio relationships between the drive shaft (AN) and output shaft (AB) for shifting of a plurality of forward gears and one reverse gear;
   the first element (SO2) of the second planetary gear set (RS2) forms the first shaft (1) designed as the drive shaft (AN) of the transmission;
   the second element (ST3) of the third planetary gear set (RS3) forms the second shaft (2) designed as the output shaft (AB) of the transmission;
   the second element (ST1) of the first planetary gear set (RS1) forms the third shaft (3);
   the first element (SO1) of the first planetary gear set (RS1) forms the fourth shaft (4);
   the third element (HO3) of the third planetary gear set (RS3) forms the fifth shaft (5);
   as the sixth shaft (6), the third element (HO1) of the first planetary gear set (RS1) and the first element (SO3) of the third planetary gear set (RS3) are constantly connected to each other;
   the first brake (B1) is arranged in a power flow between the third shaft (3) and the housing (GG);
   the second brake (B2) is arranged in a power flow between the fourth shaft (4) and the housing (GG);
   the third brake (B3) is arranged in a power flow between the fifth shaft (5) and the housing (GG);
   the first clutch (C1) is constantly connected to the seventh shaft (7);
   the second clutch (C2) is arranged in a power flow between the first and third shafts (1, 3);
   the third clutch (C3) is constantly connected to the eighth shaft (8);
   the fourth clutch is arranged in a power flow between the first and the fourth shafts (1,4);
   the second element (ST2) of the second planetary gear set (RS2) is constantly connected to the sixth shaft (6);
   the third element (HO2) of the second planetary gear set (RS2) forms the seventh shaft (7); and
   the first clutch (C1) is arranged in a power flow between the third and seventh shafts (3, 7).

2. The automatic transmission according to claim 1, wherein:
   the first element (SO4) of the fourth planetary gear set (RS4) is constantly connected to the sixth shaft (6);
   the second element (ST4) of the fourth planetary gear set (RS4) forms the eighth shaft (8);
   the third element (HO4) of the fourth planetary gear set (RS4) is constantly connected to the second shaft (2); and
   the third clutch (C3) is arranged in a power flow between the first and eighth shafts (1, 8).

3. The automatic transmission according to claim 1, wherein:
   the first element (SO4) of the fourth planetary gear set (RS4) is constantly connected to the sixth shaft (6);
   the third element (HO4) of the fourth planetary gear set (RS4) forms the eighth shaft (8);
   the second element (ST4) of the fourth planetary gear set (RS4) is constantly connected to the first shaft (1); and
   the third clutch (C3) is connected in the power flow between the second and eighth shafts (2, 8).

4. The automatic transmission according to claim 1, wherein:
   the first element (SO4) of the fourth planetary gear set (RS4) forms the eighth shaft (8);
   the second element (ST4) of the fourth planetary gear set (RS4) is constantly connected to the first shaft (1);
   the third element (HO4) of the fourth planetary gear set (RS4) is constantly connected to the second shaft (2); and
   the third clutch (C3) is connected in the power flow between the sixth and eighth shafts (6, 8).

5. The automatic transmission according to claim 1, wherein for each of the forward and reverse gear, three of the shift elements are engaged, and wherein upon a change from one of the respective gears to the subsequent higher or lower gear, only one of the previously engaged three shift elements is disengaged and only one previously open shift element is engaged.

6. The automatic transmission according to claim 5, wherein the plurality of forward gears comprises eleven forward gears, and wherein:
   in the first forward gear, the first brake (B1), the third brake (B3) and the first clutch (C1) transfer torque;
   in the second forward gear, the second brake (B2), the third brake (B3) and the first clutch (C1) transfer torque;
   in the third forward gear, the third brake (B3), the first clutch (C1) and the second clutch (C2) transfer torque;
   in the fourth forward gear, the second brake (B2), the third brake (B3) and the second clutch (C2) transfer torque;

in the fifth forward gear, the third brake (B3), the second clutch (C2) and the third clutch (C3) transfer torque;

in the sixth forward gear, the second brake (B2), the second clutch (C2) and the third clutch (C3) transfer torque;

in the seventh forward gear, the first clutch (C1), the second clutch (C2) and the third clutch (C3) transfer torque;

the eighth forward gear, the second brake (B2), the first clutch (C1) and the third clutch (C3) transfer torque;

in the ninth forward gear, the first brake (B1), the first clutch (C1) and the third clutch (C3) transfer torque;

in the tenth forward gear, the first brake (B1), the second brake (B2) and the third clutch (C3) transfer torque;

in the eleventh forward gear, the first brake (B1), the third clutch (C3) and the fourth clutch (C4) transfer torque; and in the reverse gear, the first brake (B1), the third brake (B3) and the fourth clutch (C4) transfer torque.

7. The automatic transmission according to claim 1, wherein each of the four planetary gear sets (RS1, RS2, RS3, RS4) is formed as a negative planetary gear set.

8. The automatic transmission according to claim 1, wherein at least one of the four planetary gear sets (RS1, RS2, RS3, RS4) is formed as a positive planetary gear set.

9. The automatic transmission according to claim 1, wherein one or more of the four planetary gear sets is formed as a positive planetary gear set, and one or more of the four planetary gear sets is formed as a negative planetary gear set, wherein:

the first element of each negative planetary gear set and the first element of each positive planetary gear set is formed as a sun gear;

the second element of each negative planetary gear set is formed as a planetary gear carrier, while the second element of each positive planetary gear set is formed as a ring gear;

the third element of each negative planetary gear set is formed as a ring gear; and the third element of each positive planetary gear set is formed as a planetary gear carrier.

10. The automatic transmission according to claim 1, wherein the planetary gear sets are arranged coaxially next to each other and in an axial direction behind each other in the order of first, second, third, fourth planetary gear set (RS1, RS2, RS3, RS4).

11. The automatic transmission according to claim 10, wherein the first clutch (C1) is arranged, viewed spatially, in an area axially between the first and second planetary gear sets (RS1, RS2).

12. The automatic transmission according to claim 10, wherein the third clutch (C3) is arranged, viewed spatially, on a side of the fourth planetary gear set (RS4) opposite from the third planetary gear set (RS3).

13. The automatic transmission according to claim 10, wherein the third clutch (C3) is arranged, viewed spatially, at least partially radially above the fourth planetary gear set (RS4).

14. The automatic transmission according to claim 10, wherein the third clutch (C3) is arranged, viewed spatially, in an area axially between the third and fourth planetary gear sets (RS3, RS4).

* * * * *